Sept. 28, 1965  D. P. COOPER, JR., ET AL  3,208,365
PHOTOGRAPHIC SHUTTER MECHANISM
Filed March 29, 1963  2 Sheets-Sheet 1

INVENTORS
Dexter P. Cooper, Jr.
and
Vernon E. Ford
BY
Brown and Mikulka
ATTORNEYS Sept. 28, 1965  D. P. COOPER, JR., ET AL  3,208,365
PHOTOGRAPHIC SHUTTER MECHANISM
Filed March 29, 1963  2 Sheets-Sheet 2

INVENTORS
Dexter P. Cooper, Jr.
and
BY Vernon E. Ford
Brown and Mikulka
ATTORNEYS

United States Patent Office 3,208,365
Patented Sept. 28, 1965

3,208,365
PHOTOGRAPHIC SHUTTER MECHANISM
Dexter P. Cooper, Jr., Lexington, and Vernon E. Ford, West Hanover, Mass., assignors to Polaroid Corporation, Cambridge, Mass., a corporation of Delaware
Filed Mar. 29, 1963, Ser. No. 269,001
3 Claims. (Cl. 95—60)

The present invention relates to photographic apparatus and more specifically to apparatus for controlling the movement of parts designed to effect photographic exposures.

In virtually all photographic cameras a latent image is formed in a sensitized film by movement of a shutter mechanism to allow light to impinge upon the film for a predetermined period of time. The shutter means is initially in a covering position with respect to an exposure aperture to prevent light from striking the film, and is moved away from this position to initiate the exposure. A subsequent movement of the shutter means, which may comprise a single covering element or a plurality thereof, terminates the exposure after the expiration of a predetermined period of time. Manifestly, some means are required to retain the shutter in its initial position before it is actuated to begin the exposure; additional means must be provided to cause exposure-initiating movement of the shutter upon proper actuation.

Among the most common of the means used to move the shutter are various spring arrangements which bias the shutter toward exposure-initiating movement against the retaining force of a mechanical latching device which retains the shutter in its initial position until the shutter is actuated by releasing the latch. Alternatively, the shutter may be spring biased into its initial covering position and some mechanical means used to overcome the bias and move the shutter to initiate exposure. Magnetic means have also been used both for retaining the shutter in the initial position and for moving it to the exposure-initiating position against the force of biasing means which maintain it in the initial position. The magnetic bias may be provided by a permanent magnet or by a solenoid which is energized and deenergized upon actuation of an electrical circuit. Shutter devices which utilize permanent magnets to attract a portion of the covering means, thus maintaining it in the initial position, normally are actuated by an impulse member which strikes the covering means to move it to an exposure-initiating position, a typical example of such an arrangement being that disclosed in U.S. Patent No. 2,531,936, issued November 28, 1950. In such devices, although a mechanical latch is not necessary for holding the elements of the shutter itself, the impulse member which breaks the magnetic attraction must be held by a latch against a biasing force.

The present invention has as a principal object the provision of a photographic shutter wherein magnetic means are used to maintain a portion of the shutter in an initial position and having means for creating a second magnetic field to overcome the attraction of the magnetic means and allow the shutter to move away from the initial position under a biasing force.

A further object is to provide a novel photographic shutter having first and second blades movable in sequence to initiate and terminate, respectively, a photographic exposure wherein both blades are retained in an initial position by magnetic attraction and allowed to move away from said initial position by sequentially diminishing the force of the attraction on each blade.

Another object is to provide a photographic exposure control device having shutter means movable with respect to an aperture for effecting an exposure therethrough wherein the movement of the shutter means, both to initiate and to terminate exposure, is controlled by neutralizing or releasing magnetic forces by electrical means.

A still further object is to provide a novel and improved photographic exposure control mechanism which is simple in construction, economical in manufacture and durable and reliable in use.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

In the embodiments of the invention illustrated in the accompanying drawings the shutter is shown as having two pivotally-mounted blades. It will be readily understood, however, that the principles of the invention could also be employed with one or more blades which are slidably or otherwise mounted. The configurations of the blades and exposure aperture are also subject to many modifications. Where possible the various elements of the apparatus are illustrated in a diagrammatic manner for clarity and simplicity.

Figure 1:
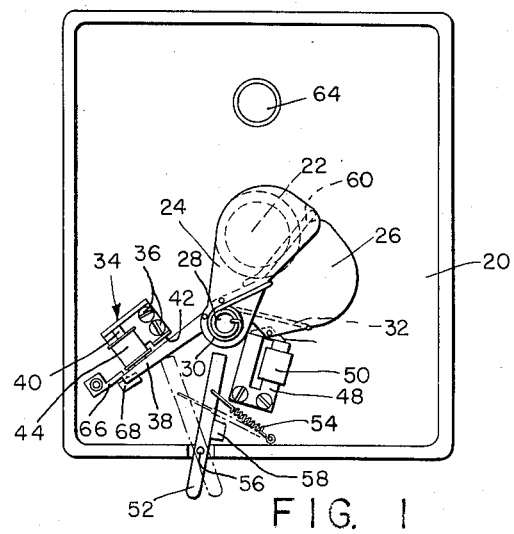
FIGURE 1 is a somewhat diagrammatic front plan view of one embodiment of the present invention, showing the shutter blades in the initial or cocked position.
Figure 2:
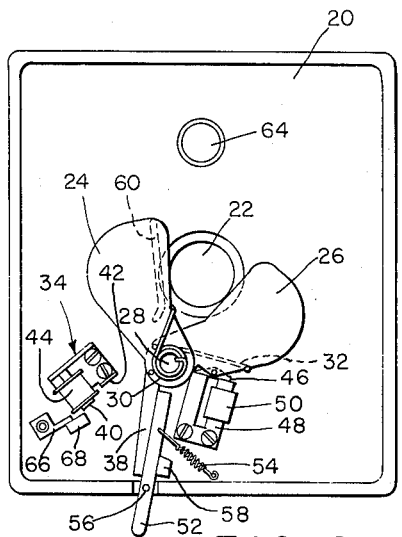
FIGS. 2 and 3 are front views of the apparatus of FIGURE 1 showing the shutter blades in the exposure and the rest positions respectively.
Figure 3:
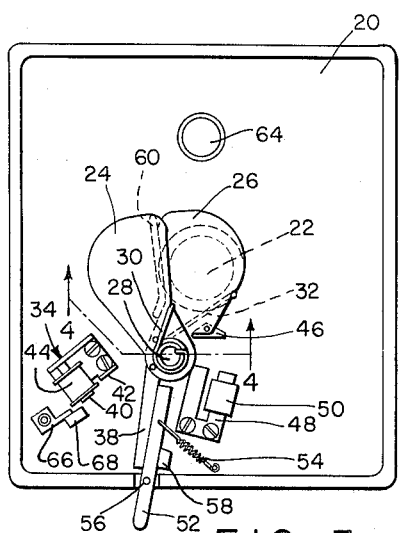

Referring now to the embodiment of the invention shown in FIGS. 1–3, there is provided the usual base plate 20 for supporting the various elements of the device. Base plate 20 is provided with an exposure aperture 22 which may be fixed or variable in size. There are also many ways of employing in conjunction with aperture 22 various diaphragm arrangements for defining an aperture the size of which may be determined either automatically or manually. Such arrangements, being well known in the art and subject to many modifications, are not shown in conjunction with the present device.

A pair of movable shutter blades 24 and 26 are mounted on a common axis, such as pin 28, for rotation thereabout between predetermined positions. When the blades are in a first or cocked position, shown in FIGURE 1, blade 24 blocks aperture 22, preventing the passage of light therethrough. When blade 24 is rotated about pin 28 to a second or rest position and blade 26 retained in its first position (FIG. 2), by means to be later described, aperture 22 is uncovered to permit passage of light. Subsequent movement of blade 26 to a second position (FIG. 3) again blocks the passage of light through aperture 22. By this sequence of movements of blades 24 and 26 a photographic exposure through aperture 22 is effected.

Figure 4:
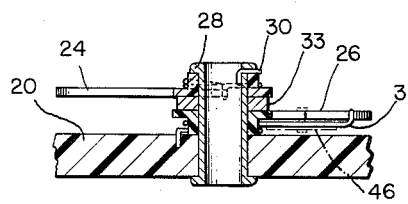
FIG. 4 is a sectional view on the line 4—4 of FIG. 3.

Blades 24 and 26 are biased toward counterclockwise rotation as seen in FIGS. 1–3 by appropriate means such as coil springs 30 and 32, arranged separately about pin 28 to exert force on blades 24 and 26 respectively, as best seen in FIG. 4. The blades may be held apart on their pivotal mounting by a spacer element, such as washer 33. Blade 24 is retained in its initial position of FIGURE 1 through the attracting force of permanent magnet 34 which is secured to base plate 20 by any convenient means such as screws 36. Arm 38, of a suitable magnetizable material, is rigidly attached to or a part of blade 24 and extends past pin 28 to contact one pole 40 of permanent magnet 34. The end of pole 40 contacted by arm 38 is preferably rounded in order to provide a constant contacting surface or gap regardless of slight variations in alignment of arm 38 and magnet 34 which may occur. A slight air space is provided between arm 38 and pole 42 when the arm is in contact with pole 40. This augments the magnetic bond without adding to the actual contacting surface between the arm and magnet.

Coil 44 is disposed about pole 40 in such a way that when an electric current is passed through the coil the induced magnetic field associated with the current-carrying coil is opposed in polarity to permanent magnet 34. Thus, when a current is passed through coil 44 the attracting force of permanent magnet 34 is neutralized by the induced field, allowing blade 24 to move to the second position under the bias of spring 30. The magnitude of the induced field may be somewhat less than that of the permanent field since it is necessary to the function of the device only that the bias of spring 30 exert a stronger force on blade 24 than does the holding power of permanent magnet 34. It is preferred, however, that when the induced field opposes the permanent field the holding force exerted by magnet 34 be considerably less than the biasing force exerted by spring 30 in order to insure reliable operation of blade 24 each time current is passed through coil 44.

Associated with blade 26, either by being a part thereof or being in some way attached thereto, is element 46. Electromagnet 48, which is energized by passage of current through coil 50, is affixed to base plate 20 in such a position as to be contacted by element 46 when blade 26 is in its first position, at least that portion of element 46 contacting electromagnet 48 being of magnetizable material. When electromagnet 48 is actuated blade 26 is held thereby against the biasing force of spring 32. It is therefore evident that the magnitude of the holding power of electromagnet 48 must be in excess of the biasing force of spring 32. Through the application of circuitry to be described hereinafter, current is passed substantially simultaneously through coils 44 and 50, allowing blade 24 to move from the first to the second position and retaining blade 26 in the first position (FIG. 2). Upon the expiration of a predetermined time interval, which may also be a function of the circuitry, the current through at least coil 50 is shut off, thus deenergizing electromagnet 48 and allowing blade 26 to move to the second position (FIG. 3) under the bias of spring 32.

The motion of blade 24 is halted in the second position by contact of arm 38 with cocking lever 52, a portion of which projects beyond the edge of base plate 20. Spring 54 biases lever 52 about its pivotal mounting on pin 56 in a clockwise direction as seen in FIGS. 1–3 against stop 58 which projects from base plate 20. Blade 26 is retained in its first position prior to release of blade 24 and is halted in its second position by contact of an edge thereof with a projecting rib 60 on blade 24. The end of lever 52 which projects past base plate 20 may be manually engaged and rotated in a counterclockwise direction to return blades 24 and 26 from the position of FIG. 3 to that of FIG. 1. Blade 24 is rotated by contact of lever 52 with arm 38 and blade 26 is rotated by rib 60 contacting the edge thereof. Element 46 must contact electromagnet 48 and arm 38 must contact permanent magnet 34 when the blades are in the first position. In order to insure that this condition exists while allowing for slight variations in dimensions throughout the several elements, arm 38 may be slightly resilient so that as cocking lever 52 is rotated, element 46 contacts electromagnet 48 slightly before arm 38 contacts permanent magnet 34. A small amount of additional rotation of lever 52 after the blades have reached their first position and stopped, due to contact of element 46 with electromagnet 48 and rib 60 with blade 26, will bring the resilient end of arm 38 into contact with permanent magnet 34. The blades will be retained in this position by magnet 34 since the current through coil 44 is cut off at some desired time after blade 24 leaves its first position. Cocking lever 52 will be in the position indicated in dotted lines in FIGURE 1 when rotated to bring the blades to the first position and when released will return to the position shown in solid lines under the bias of spring 54.

Figure 7:
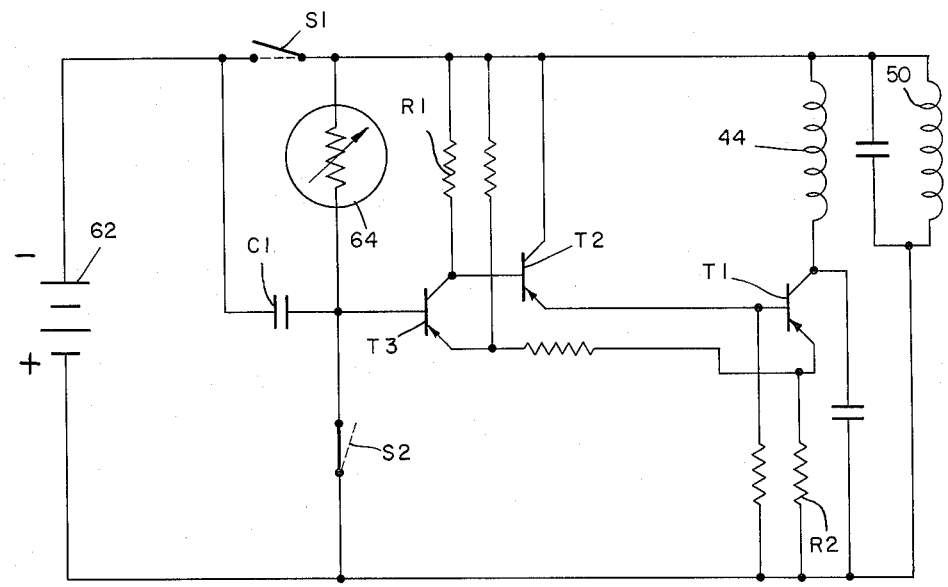
FIG. 7 is a schematic diagram of a suitable circuit for use in conjunction with the illustrated embodiments of the apparatus.

Thus, the blades are retained in their initial, light-blocking position relative to the exposure aperture by means of the attracting force of a permanent magnet. An induced field is created, opposed in polarity to the field of the permanent magnet and of sufficient magnitude to reduce the attracting force thereof to such a degree as to allow the first blade to move under a biasing force to a second, light-admitting position. At the expiration of a predetermined exposure interval, the second blade is moved to a light-blocking position relative to the exposure aperture. The induced field which opposes the permanent field is created by passing an electrical current through a coil by the use of suitable circuitry which may also cooperate to retain the second blade in its first position and establish the said predetermined exposure interval. A suitable example of such circuitry is shown schematically in FIG. 7, wherein like reference numerals denote the schematic counterpart of elements of the circuitry seen in the other figures of the drawings.

Included in the circuit are an electric power source, such as battery 62, and a light sensitive cell 64 which is also seen in FIGS. 1–3 facing the side of base plate 20 from which light enters exposure aperture 22.

Switch S1 is interposed in the circuit and is closed by operation of the shutter release button or lever (not shown) normally placed at some convenient point on the camera body or shutter housing. Such buttons are usually depressed or otherwise moved manually to actuate the shutter mechanism and switch S1 may comprise a pair of contacts which are moved together by such movement of the shutter release button. It will be noted that when the blades are in the cocked position, prior to making an exposure, S1 is open.

A second switch S2 is closed when the shutter blades are cocked, and is opened by movement of arm 38. As seen in FIGURE 1, the end of arm 38 most remote from blade 24 is in contact with switch element 66. The end of arm 38 and element 66 form the two contacts of switch S2 and are therefore constructed of suitable electrically conducting material and wired into the circuit by appropriate means. Much of the circuit may conveniently comprise a printed circuit on the opposite side of base plate 20.

With the shutter in the cocked position (S1 open) no current is flowing through coils 44 and 50. Operation of the camera shutter release button closes S1, allowing current to flow from battery 62 through coils 44 and 50, thus creating an induced magnetic field associated with coil 44 and energizing electromagnet 48 associated with coil 50. As previously mentioned, the current flows through coil 44 in such a direction that the induced magnetic field associated therewith is opposed to the field of permanent magnet 34. Thus, as soon as switch S1 is closed the attraction of magnet 34 for arm 38 is eliminated or reduced sufficiently so that spring 30 may move blade 24 from the position of FIGURE 1 to that of FIG. 2. As arm 38 begins to move, the end of element 66, being somewhat resilient and held in a slightly flexed position by the end of arm 38 when the shutter is cocked, moves for a short distance with arm 38. Stop 68 is affixed to back plate 20 and projects into the path of movement of a portion of element 66 while not interfering with the movement of arm 38. Thus, switch S2 is opened by the continued movement of arm 38 when element 66 strikes stop 68. This offers the advantages of a clean, vibration-free opening of switch S2 over a system where the switch is opened by arm 38 moving away from a stationary contact.

Since electromagnet 48 is energized as soon as switch S1 is closed, blade 26 is retained in its first position by attraction of the magnet for element 46 when blade 24 moves away from its first position. Current will cease to flow through coil 50, deenergizing electromagnet 48 and allowing blade 26 to terminate the exposure, through the operation of the electronic switching circuit shown in FIG. 7. Such circuits have previously been used in connection with photographic exposure control apparatus and the illustrated circuit is but one of many embodiments suited for such application.

It may be readily seen from the foregoing description that the duration of exposure through aperture 22 will correspond substantially to that period from the time current begins to flow through coils 44 and 50 to the time when the current through coil 50 is shut off. This period is established in the present circuit by the time rate of discharge of capacitor C1. When the shutter is in the initial position with switch S1 open and switch S2 closed capacitor C1 will be charged. When switch S1 is closed, allowing current to flow through coils 44 and 50, blade 24 will move away from its initial position and begin the exposure interval by uncovering aperture 22. As blade 24 and arm 38 move to initiate the exposure interval switch S2 opens as previously described and capacitor C1 begins to discharge through photocell 64. When switch S1 is closed and current begins to flow, transistors T1 and T2 are conducting. Transistor T3 is not conducting since capacitor C1 has a maximum charge at this time, thus making the base of transistor T3 more positive than its emitter. As capacitor C1 discharges the base of transistor T3 becomes more negative until, when capacitor C1 has discharged to a predetermined level, transistor T3 begins to conduct. With current flowing through transistor T3 the voltage drop across resistor R1 causes the base of transistor T2 to become more positive. Transistor T2 will stop conducting and thus switch off the base current of transistor T1 when the base of transistor T2 becomes more positive than its emitter. Switching off of transistor T1 stops the flow of current through coil 50, deenergizing electromagnet 48 and allowing blade 26 to move to its second position to terminate the exposure. Switch S1 is opened as soon as the operator allows the shutter release button to return to its initial position. This cuts off the flow of current through coil 44 so that the field of permanent magnet 34 is restored and arm 38 will be attracted thereby, retaining the shutter in the cocked position when it is returned to such by rotation of cocking lever 52.

A positive feedback is also provided in the circuit for faster response. That is, when transistor T1 begins to stop conducting the reduction in voltage drop across resistor R2 causes the emitter of transistor T1 to become more positive even faster than the discharge of capacitor C1, thus switching off transistor T2 and T1 faster.

The time for which aperture 22 is uncovered to admit light is therefore a function of the time rate of discharge of capacitor C1. Since the rate of discharge of capacitor C1 is determined by the electrical properties of photocell 64 and these in turn are determined by the intensity of light incident thereon, the duration of exposure is functionally related to the scene brightness. The timing sequence of the circuit is initiated when capacitor C1 begins to discharge. This occurs upon opening of switch S2 in response to movement of blade 24 away from the covering position. Hence, the timing sequence begins simultaneously with the actual exposure and is a function of scene brightness, thus insuring a proper exposure interval.

Figure 5:
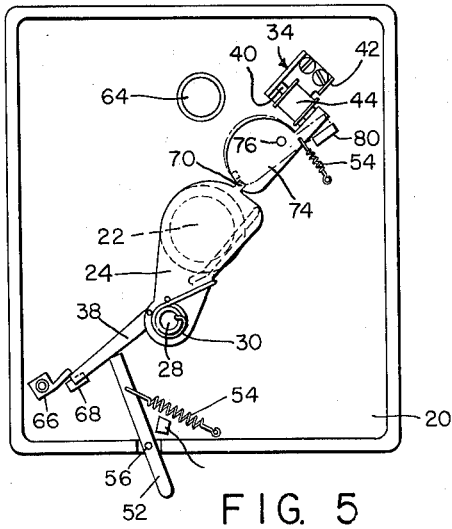
FIGS. 5 and 6 are front plan views of selected elements of a second embodiment of this invention, showing the elements in the positions corresponding to the cocked and the rest positions, respectively.
Figure 6:
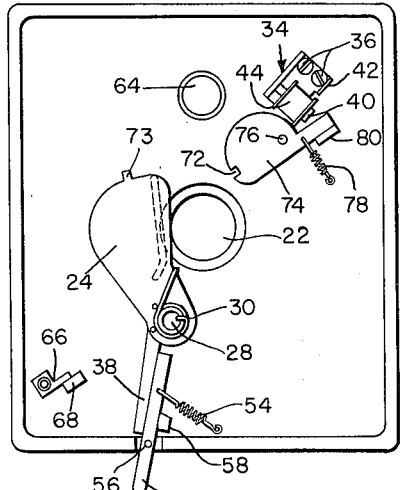

It is also possible, and under some circumstances desirable, to construct blade 24 and the arm which contacts magnet 34 as separate elements with a suitable coupling therebetween. Such an embodiment is illustrated in pertinent part in FIGS. 5 and 6. Blade 24 is shown in FIG. 5 in the initial or cocked position, being retained therein by engagement of pin 70 in notch 72 of release arm 74. Permanent magnet 34, constructed as in the previously described embodiment, attracts a portion of arm 74 which is pivotally mounted on pin 76. Blade 24 is again biased away from its initial position by spring 30 which causes pin 70 to exert a clockwise rotation force on arm 74. When the field of magnet 34 is diminished by passing a current through coil 44, arm 74 is allowed to move in a counterclockwise direction, either under the force exerted by pin 70 or by an additional spring 78 which acts directly on arms 74, or both. A small amount of rotational movement of arm 74 allows pin 70 to disengage from notch 72 so that blade 24 continues to move under the bias of spring 30 to the open or rest position. Stop 80 may be provided to halt the movement of arm 74 in a predetermined position after pin 70 has disengaged therefrom, as seen in FIG. 6. As blade 24 is returned to the cocked position, as by rotation of a suitably positioned cocking lever, pin 70 will engage slot 72 and move arm 74 as blade 24 continues to move. When arm 74 contacts magnet 34 the elements will again be retained thereby in the position of FIG. 5.

It will be noted that the portion of arm 74 on the side of its pivotal mounting remote from magnet 34 is considerably larger and of greater mass than the opposite portion. Increasing the inertia of arm 74 in this manner has the effect of appreciably lengthening the time required for arm 74 to begin moving after current begins to flow through coil 44. Hence, the time is lengthened between the closing of switch S1 and the actual movement of blade 24. This additional time allows the field of electromagnet 48 to build up sufficiently to insure that it will retain blade 26 in its first position after blade 24 begins to move.

Blade 26, electromagnet 48, and element associated therewith, as well as the circuitry, may be the same as in the previously described embodiment. Although the shutter is shown in FIGS. 5 and 6 as being cocked in the same manner and switch S2 being opened in the same manner as in the embodiment of FIGS. 1–3, it is to be understood that this portion of the apparatus is subject to many modifications within the scope of the invention. For example, switch S2 may be opened by having element 66 initially in contact with release arm 74, which moves out of contact upon movement of blade 24 away from the cocked position.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic exposure control device comprising, in combination, means defining an exposure aperture, at least one first shutter blade movable from a covering to an uncovering position relative to said aperture to initiate an exposure therethrough, at least one second shutter blade, movable from an uncovering to a covering position with respect to said aperture to terminate said exposure, first and second biasing means respectively urging said first blade toward its uncovering position and said second blade toward its covering position means creating a first magnetic field for retaining said first blade in its covering position against the force of said first biasing means, means associated with said first blade and movable therewith for retaining said second blade in its uncovering position against the force of said second biasing means while said first blade is in its covering position, first electrically actuated means adapted upon actuation to so diminish said first magnetic field as to allow said first blade to move to its uncovering position, second electrically actuated means adapted upon actuation to create a second magnetic field for retaining said second blade in its uncovering position against the force of said second biasing means, and means for simultaneously actuating said first and second electrically actuated means, the static inertia opposing movement of said first blade away from its covering position beng such that said second magnetic field has attained substantially its peak force before said first blade moves away from its covering position.

2. A photographic exposure control device comprising, in combination, means defining an exposure aperture, a first shutter blade movable from a covering to an uncovering position with respect to said aperture to initiate a photographic exposure therethrough, a first biasing element tending to move said first blade toward its uncovering position, a second shutter blade movable from an uncovering to a covering position with respect to said aperture to terminate said exposure, a second biasing element tending to move said second blade toward its covering position, a movable element adapted, when in a first position, to retain said first blade in its covering position, a first magnetic element for attracting and thereby retaining said movable element in its first position, an electrically conducting element, an electromagnet which becomes energized in response to passage of current through said conducting element and adapted when energized to attract and thereby retain said second blade in its uncovering position, means associated with said first blade and movable therewith for retaining said second blade in its uncovering position when said first blade is in its covering position and prior to energization of said electromagnet, and means for smultaneously causing current to pass through said conducting element and reducing the attracting force of said first magnetic element whereby said movable element may move away from its first position and said first blade may move away from its covering position, the static inertia of said movable element being such that said electromagnet has become substantially fully energized prior to movement of said movable element away from its first position.

3. A photographic exposure control device according to claim 2 wherein said first magnetic element comprises a permanent magnet.

References Cited by the Examiner
UNITED STATES PATENTS 2,800,844   7/57   Durst _____ 95—60
2,999,445   9/61   Fahlenberg _____ 95—63

NORTON ANSHER, *Primary Examiner.*

JOHN M. HORAN, *Examiner.*